RE 25057

United States Patent Office 2,830,080
Patented Apr. 8, 1958

2,830,080

PREPARATION OF PERACETIC ACID

Harold B. Stevens, Shawinigan Falls, Quebec, Canada, assignor to Shawinigan Chemicals Limited, Montreal, Quebec, Canada, a corporation of Canada No Drawing. Application April 30, 1956
Serial No. 581,383

11 Claims. (Cl. 260—502)

This invention relates to the preparation of peracetic acid, and in particular to the preparation by the catalytic oxidation of acetaldehyde.

The oxidation of liquid acetaldehyde with gaseous oxygen, in pure or dilute form such as air or oxygen-enriched air, has been practised for many years. Originally the principal product of the oxidation was acetic acid. It was subsequently observed that acetic anhydride and water also are formed during the oxidation of liquid acetaldehyde with gaseous oxygen, and that acetic anhydride can be isolated from the oxidation mixture, giving acetic anhydride as the principal product.

It has also previously been observed that, during the oxidation of liquid acetaldehyde with oxygen gas, some peracetic acid can be formed. However, when acetic acid and acetic anhydride were sought as the principal products, the accumulation of peracetic acid was undesirable, and conditions of reaction were always chosen to minimise or preclude the accumulation of peracetic acid. Peracetic acid, being an unstable and highly reactive compound, tends to decompose or further react under the conditions usually present in the oxidation of acetaldehyde, and can decompose sufficiently rapidly to create an explosion.

It is now desired to produce peracetic acid in as high yield as possible by the oxidation of acetaldehyde with gaseous oxygen. It has been found that liquid acetaldehyde can be oxidized with oxygen-containing gas in the presence of certain materials which promote the accumulation of peracetic acid, and that satisfactory conversion of the acetaldehyde to peracetic acid can be obtained. Throughout this specification and the appended claims, reference to oxidation with oxygen-containing gas is to include oxidation with pure oxygen gas and oxidation with gas containing oxygen in dilute form, for example air and oxygen-enriched air. It has also been found that the catalytic reaction for conversion of acetaldehyde to peracetic acid according to this invention can be assisted by suitable temperature control. As the temperature of reaction increases, the rate of formation of peracetic acid increases, but the rate of decomposition of the peracetic acid also increases and can become so rapid as to render preparation of peracetic acid impractical at higher temperatures. The peracetic acid is formed in a reaction mixture from which it can, if necessary, be partially or completely separated, or in which it can be used directly, as a solution in diluent. The oxidation of acetaldehyde to peracetic acid can also be beneficially carried out in the presence of an organic liquid diluent.

The invention thus comprises a process for the preparation of peracetic acid comprising oxidizing liquid acetaldehyde with oxygen-containing gas in the presence of one halide salt catalyst of the group consisting of the chloride and bromide salts of copper, the chloride and bromide salts of cobalt, and cupric ammonium chloride. The process can be carried out either batchwise or as a continuous process as desired.

By the process of this invention, a reaction mixture is produced which contains satisfactory and useful proportions of peracetic acid; under normal conditions for the reaction, the process can achieve a peracetic acid yield of about 75% of the acetaldehyde oxidized.

Under preferred conditions, the oxidation of acetaldehyde to peracetic acid with gaseous oxygen is conducted at a temperature in the range between 0° and 50° C., most preferably between 5° C. and 40° C. However, the reaction can also be carried out at higher temperatures, for example up to 60° C., but the decomposition rate of peracetic acid at the higher temperatures is so high as to reduce the yield of peracetic acid to undesirably low levels. The reaction can also be carried out at lower temperatures, for example down to —30° C., but at the lower temperatures the reaction is undesirably slow and the products tend to freeze.

It is also advantageous to carry out the oxidation of liquid acetaldehyde to peracetic acid with gaseous oxygen in the presence of an organic liquid diluent. Suitable diluents are, for example, volatile esters, especially ethyl acetate, methyl acetate, acetone, and acetic acid, which is also a product of the oxidation of acetaldehyde and a by-product in the process of the present invention. The presence of an organic liquid diluent during the reaction decreases the partial vapor pressure of the liquid acetaldehyde and helps reduce loss of acetaldehyde as vapor in any gases vented from the reaction. The presence of a liquid diluent also enables the reaction to be carried out with acetaldehyde in the liquid phase at temperatures above the latter's boiling point at the prevailing pressure. Most desirable, however, is the effect of the liquid diluent in decreasing the extent of chemical reaction between peracetic acid and acetaldehyde, which reaction obviously has deleterious effects on the yield of recoverable peracetic acid. A particular advantage of the use of acetic acid as a diluent is that such diluent need not be completely separated from the reaction products to obtain a satisfactory commercial product, since acetic acid also is produced during the reaction and peracetic acid is usually sold as a solution in acetic acid solvent. The proportion of diluent maintained in the reaction mixture during oxidation is not critical, and can conveniently vary between 0 and 90% by weight of the reaction mixture.

The proportion of catalyst required for the process of this invention can vary over the range of catalyst concentrations usually used in the oxidation of acetaldehyde with oxygen-containing gas, i. e., usually in the range between 0.002% and 0.20% by weight of the reaction mixture.

It is possible and sometimes convenient to form a catalyst for the reaction of this invention in situ during reaction. This is readily done by introducing into the liquid reactant a soluble salt of, for example, copper or cobalt before starting the reaction, then introducing dry gaseous hydrogen chloride or hydrogen bromide to the reaction with the gaseous oxygen, thus forming catalyst for the production of peracetic acid as oxidation proceeds.

The refined product of the process of this invention is a solution of peracetic acid in acetic acid, the peracetic acid constituting at least about 5% by weight of the acetic acid. The direct product of the process of the invention contains peracetic acid and acetic acid but also includes catalyst residues, the diluent when liquid diluent has been used during oxidation, and also usually includes some unoxidized acetaldehyde. Concentrated peracetic acid can be separated from the reaction product by various methods, for example by low temperature distillations at very low pressures of the order of 1 to 10 millimeters of mercury.

For commercial purposes, it is often sufficient to separate the direct product of this process only to the extent of providing a solution of peracetic acid in acetic acid. A solution of peracetic acid in acetic acid can readily be obtained from the direct product of the process of this invention by distillation at a pressure not greater than about 40 millimeters of mercury.

The following examples are given to illustrate, but not to limit, the scope of the invention.

*Example 1*

A mixture of 60 grams of a solution of ethyl acetate containing about 0.01% by weight cobaltous chloride hexahydrate and 20 grams of acetaldehyde was charged to a reaction vessel consisting of a vertical glass tube fitted with a cooling jacket, a sintered glass diffuser located near the bottom to serve as the gas inlet, a thermometer, a reflux condenser vented to the atmosphere, and means for taking and returning liquor samples. The mixture was cooled to about 2° C. in the reaction vessel; then oxygen from a cylinder was added through the diffuser at a rate of two to three cubic feet per hour while the temperature of the reaction mixture was maintained at about 5° C.±3° C. by cooling. Samples were drained from the reaction vessel periodically and analysed for peracetic acid content. (Analysis for peracetic acid was based on instantaneous liberation of iodine from cold aqueous potassium iodide solution acidified with sulphuric acid, and immediate titration of the iodine with standard sodium thiosulphate solution.) The acetaldehyde content of the reaction mixture was also determined on these samples, by conventional means. A mixture of one volume of ethyl acetate containing 0.01% by weight of cobaltous chloride hexahydrate and nine volumes of acetaldehyde was slowly added to the reaction vessel at a rate sufficient to maintain the total volume of liquor in the reaction vessel approximately constant, making up for the volume of samples removed and the loss of volatile material escaping as vapor past the reflux condenser. The relative proportions of ethyl acetate and acetaldehyde in this mixture were chosen in an attempt to maintain a substantially constant concentration of ethyl acetate in the reaction vessel. Choice of the suitable proportions was governed by the efficiency of the reflux condensing facilities fitted on the reaction vessel. A total of 15 ml. of the foregoing mixture was added to the reaction vessel over a period of one hour. An hour after the addition of oxygen was started, the peracetic acid content of the reaction mixture had risen to 19.5% by weight. The addition of oxygen was stopped about 20 minutes later and the reaction mix cooled to 0° C., sampled for analysis, and stored at −50° C. pending distillation. The reaction mixture was found to contain 18.5% by weight of peracetic acid. A sample of the reaction mixture was then distilled, in the absence of permanent gases, by repeated evaporation at 0° to 20° C. and condensation at temperatures down to −80° C. The distilled fraction richest in peracetic acid was found to contain 31% by weight of peracetic acid by the analysis procedure outlined above. The presence of peracetic acid in this fraction in approximately this concentration was confirmed by comparison of the infra-red spectrum of its vapor and the ultra-violet spectrum of a solution of the fraction with the corresponding spectra of a known sample of peracetic acid. The balance of the fraction was substantially all acetic acid and ethyl acetate, and the over-all composition of the fraction was suitable for commercial peracetic acid compositions.

*Example 2*

In this example, the process of the invention was operated as a continuous process. The reaction vessel used was similar to that described in Example 1, and in addition it was provided with a liquid product overflow and means for introducing liquid feeds continuously at a point slightly above the diffuser. The vessel was also equipped with an external pipe connecting a point at the top of the vessel through a liquid seal to the lower part of the vessel slightly above the diffuser; this pipe facilitated steady operation, improved heat transfer and mixing of reactants, and provided a more nearly constant overflow rate. Portions of powdered solid catalyst were added to the vessel at intervals through a funnel, and were washed into the vessel with 5 ml. portions of ethyl acetate.

To start, a slow stream of nitrogen was forced through the diffuser, and 0.04 gram cobaltous chloride hexahydrate and 800 grams of a mixture of 90% ethyl acetate and 10% acetaldehyde by weight were charged to the vessel. The temperature of the mixture was adjusted to 20° C. Then a stream of 2 to 3 cubic feet per hour of oxygen was substituted for the nitrogen stream. Oxidation of the acetaldehyde started, and the temperature of the reaction mixture was allowed to rise to 35° C. and then maintained constant by cooling. Ten minutes after the oxygen flow was started, continuous addition to the reaction vessel of a liquid feed mix containing 10% by weight of acetaldehyde and 90% by weight of ethyl acetate at a rate of 600 to 700 ml. per hour was started. Solid cobaltous chloride hexahydrate was added to the reaction vessel in 0.02 gram portions at intervals of fifteen minutes. Periodic samples of the reaction mixture were analysed, and when the reaction mixture had achieved a dynamic equilibrium composition, it was found to contain about 7% by weight of peracetic acid, 1.0–1.5% acetaldehyde, and about 2% acetic acid, the remainder being largely ethyl acetate. This dynamic equilibrium composition of reaction mixture was maintained without substantial variation for a period of four hours, during which time about 235 grams of acetaldehyde, admixed with ethyl acetate as indicated, was added to the reaction mixture.

*Example 3*

A mixture of 40 grams of acetaldehyde and 40 grams of ethyl acetate saturated at room temperature with cupric bromide was charged to the reaction vessel used in Example 1. The mixture was cooled to 10° C.; then oxygen from a cylinder was added through the diffuser at a rate of two to three cubic feet per hour while the temperature was maintained at 10° C. by cooling. Periodic samples of the reaction mixture were analysed as in Example 1. The volume of liquid in the reaction vessel was maintained constant by addition of acetaldehyde-ethyl acetate mixture containing nine volumes of acetaldehyde to one volume of ethyl acetate saturated with cupric bromide. One and a quarter hours after oxidation with oxygen had started, the peracetic acid content of the reaction mixture was found to be 16.8% by weight.

*Example 4*

A mixture of 20 grams of acetaldehyde and 60 grams of ethyl acetate saturated at room temperature with cobaltous chloride hexahydrate was charged to the reaction vessel used in Example 1. The mixture was cooled to 10° C.; then a mixture of oxygen gas from a cylinder and commercial dry nitrogen was added through the diffuser at a rate of two to three cubic feet per hour, while the temperature of the reaction mixture was held at 10° C. by cooling. The liquid volume in the reaction vessel was maintained constant as in Example 1. Initially the proportion of oxygen in the gas mixture was maintained at about 22% by volume. One and a half hours after oxidation started the reaction mixture was found to contain 10.7% by weight of peracetic acid. At the end of two and a quarter hours the proportion of peracetic acid in the reaction mixture had dropped to 6.7% by weight and the proportion of acetic acid had increased, indicating that some of the peracetic acid probably had been converted to acetic acid. Then the proportion of oxygen in the gas mixture being added was gradually increased to 50% by volume. At the end of four hours from the start of the run, with 50% oxygen in the oxidizing gas, the proportion of peracetic acid in the reaction mixture had risen to 14.0% by weight.

What is claimed is:

1. A process for the preparation of peracetic acid comprising oxidizing liquid acetaldehyde with oxygen-containing gas in the presence of one halide salt catalyst of the group consisting of the chloride and bromide salts of copper, the chloride and bromide salts of cobalt, and cupric ammonium chloride, to form peracetic acid.

2. A process as claimed in claim 1 in which oxygen-containing gas is pure oxygen gas.

3. A process as claimed in claim 2, in which the oxidation is carried out at a temperature in the range between −30° C. and 60° C.

4. A process as claimed in claim 3, in which the temperature is in the range between 5° C. and 40° C.

5. A process as claimed in claim 4, in which the oxidation is carried out in the presence of an organic liquid diluent.

6. A process as claimed in claim 5, in which the diluent is a liquid of the group consisting of methyl acetate, ethyl acetate, acetone, and acetic acid.

7. A process as claimed in claim 1, in which the oxygen-containing gas is air.

8. A process as claimed in claim 1 in which the oxygen-containing gas is oxygen-enriched air.

9. A process as claimed in claim 1, including the further step of separating the peracetic acid from the reaction mixture, together with a proportion of the acetic acid formed simultaneously with the peracetic acid, by distillation of the reaction mixture, to form a solution of peracetic acid in acetic acid.

10. A process as claimed in claim 1, in which the oxidation is carried out in the presence of liquid ethyl acetate as a diluent.

11. A process as claimed in claim 1, in which the oxidation is carried out in the presence of liquid methyl acetate as a diluent.

References Cited in the file of this patent

UNITED STATES PATENTS

| 1,179,421 | Galitzenstein et al. | Apr. 18, 1916 |

FOREIGN PATENTS

| 272,738 | Germany | Apr. 6, 1914 |

OTHER REFERENCES

Swern: Chem. Rev. 45: 6 (1949).